Dec. 30, 1952     E. M. ARTHUR     2,623,297
WHEEL TRACK GAUGE
Filed Dec. 4, 1950     2 SHEETS—SHEET 1
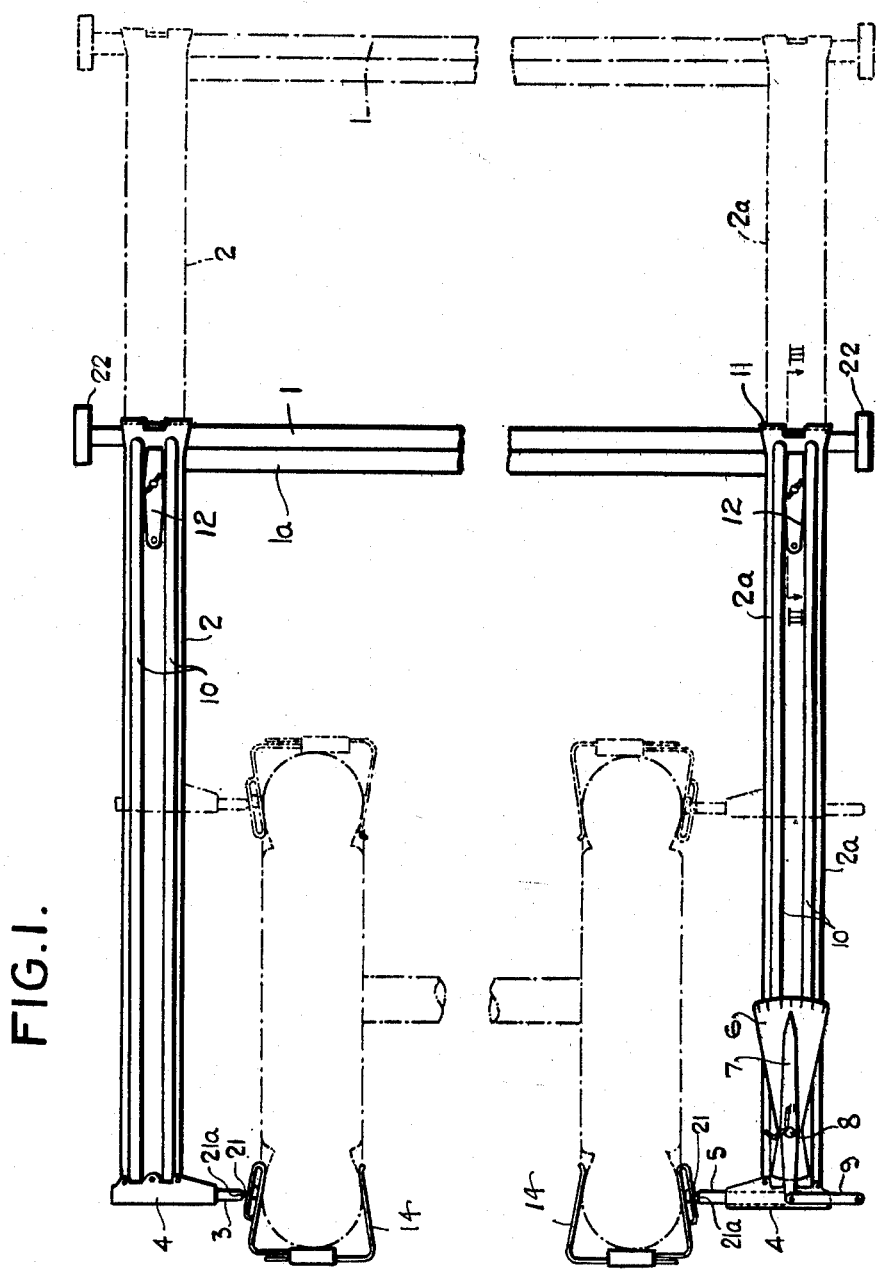
FIG.I.
E. M. Arthur
INVENTOR,
BY *C. A. Snow & Co.*
ATTORNEYS.

Dec. 30, 1952 — E. M. ARTHUR — 2,623,297
WHEEL TRACK GAUGE
Filed Dec. 4, 1950 — 2 SHEETS—SHEET 2
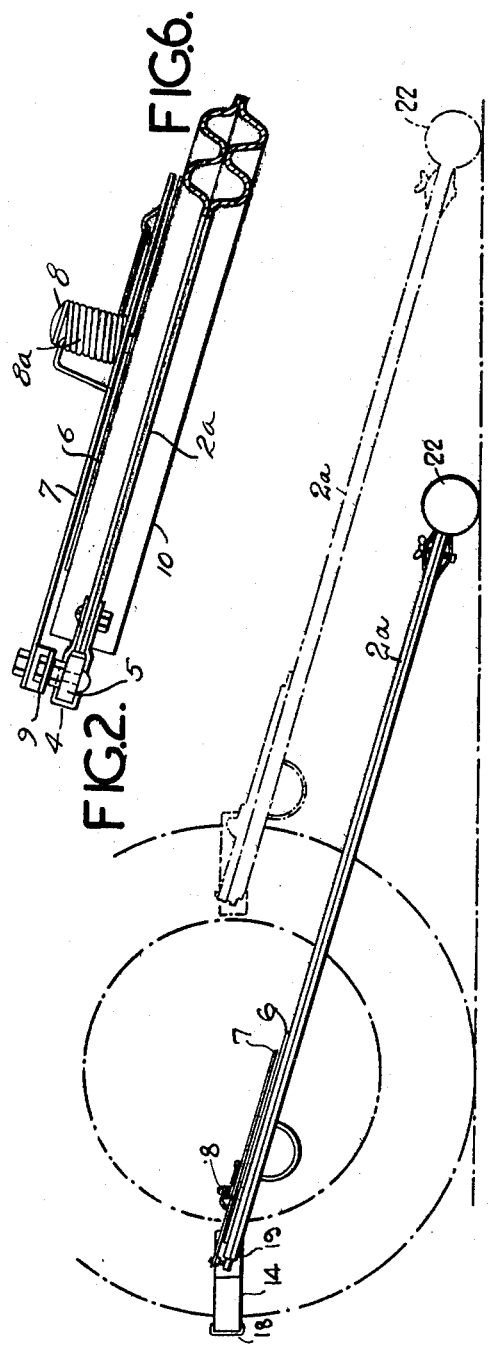
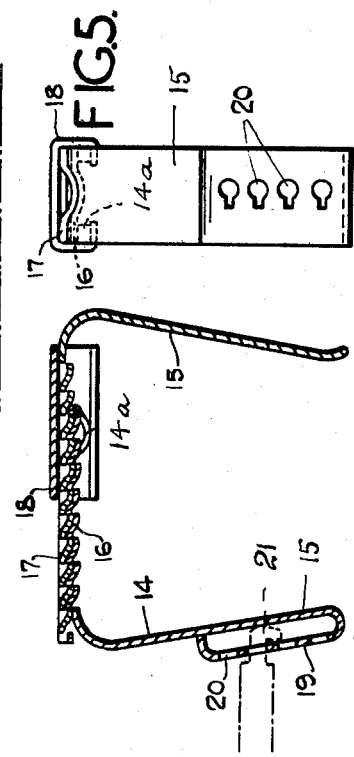
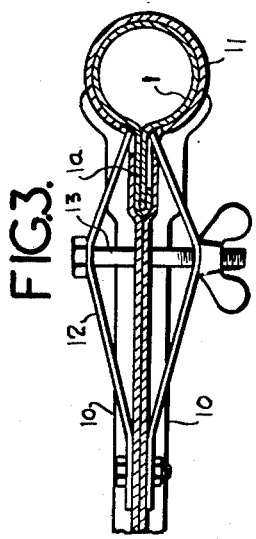
E. M. Arthur
INVENTOR,
BY C. A. Snow & Co.
ATTORNEYS.

Patented Dec. 30, 1952

2,623,297

UNITED STATES PATENT OFFICE 2,623,297

WHEEL TRACK GAUGE

Evan Meirion Arthur, West Heath, Birmingham, England

Application December 4, 1950, Serial No. 198,946
In Great Britain December 7, 1949

3 Claims. (Cl. 33—203.17)

1

This invention relates to gauges for testing the track of the front wheels of motor vehicles, and it has for its object a track gauge which facilitates the accuracy and the quickness of the gauging operation. A further object is a gauge which is fitted on the wheels and which enables the front and back track measurements to be obtained without detaching the gauge from the wheels.

Referring to the drawings—

Figure 1 is a plan view of a gauge constructed according to this invention.

Figure 2 is a side elevation.

Figure 3 is a section on line III—III of Figure 1.

Figure 4 is a section through a tyre clip.

Figure 5 is a side elevation of the clip, and

Figure 6 is an enlarged side elevation of upper portion of a side member of the gauge.

According to a convenient embodiment of this invention, the gauge comprises a U-shaped frame formed of a transverse bar 1 and two side arms 2 and 2a. A feeler finger or gauging member 3 is fixed in the bracket 4 mounted on the end of an arm 2 and a feeler finger or gauge member 5 is mounted in a bracket 4 so that it is normally spring-urged inwardly and the movement of the finger 5 from one position to another is indicated on the scale on a dial plate 6 mounted on the arm 2a, for which purpose a pointer 7 is pivotally mounted intermediate its ends on a pin 8 on the arm 2a, and the outer end of the arm 7 is connected by a link 9 to the outer end of the feeler finger 5. A coiled spring 8a is mounted on the pin 8 and one end of the spring is anchored to the pointer arm 7 and the other end to the arm 2a, so that the spring normally presses the feeler finger 5 inwardly. The dial plate 6 is also pivotally mounted on the pin 8 and is frictionally held against the arm 2a, so that its position can be adjusted for the purpose hereinafter described. The arms 2 and 2a are each formed of two metal plates having strengthening grooves 10 therein, the plates being spot welded together, and the outer ends of the arms are shaped to form sockets 11. The transverse bar 1 is formed of sheet metal bent to form round bar with radial web 1a and the socket 11 is shaped to slidably engage the bar 1 and the web 1a, the arms being clamped in the adjusted position by means of bow springs 12, one on each side of the arm 2a. The bow springs are fixed at their inner end to the arm 2a and the outer ends pass through slots in the arms to bear against the opposite sides of the web 1a and the shoulders at the junction of the radial web 1a and

2 the round portion of the bar. A bolt 13 passes through perforations in the centre of the two springs 12 and the arm 2a and by tightening the wing nut on the bolt 13 the springs are pulled together to force the outer ends downwardly and clamp on the bar 1. The feeler fingers 3 and 5 are pivotally mounted in U-shaped clamps 14 mounted on the tyres of the front wheels of a motor vehicle. The U-shaped clamps 14 comprise two clamping legs 15 which are adapted to spring grip on each side of the tyre, and the legs are adjustable apart for fitting different sizes of tyres by means of the cross strips 16 and 17 which have ratchet teeth pressed therein so that the cross strips are free to permit the clamping legs 15 to close together but normally prevent from opening apart. A sleeve 18 surrounds the cross strips 16 and 17 to hold, when moved to lie over the projection 14a on the end of one arm, such arms in the adjusted position, the depth of the sleeve permitting the ratchet teeth to be disengaged when the sleeve is slid out of engagement with said projection 14a. When the clamp is adjusted for size, the limbs can be forced over a tyre to be firmly spring held in position. Each outer limb 15 is bent backwardly to form a lug or member 19 spaced from the limb 15, and this lug has a series of keyhole slots 20 therein. The ends of the feeler fingers 3 and 5 have L-shaped projections which can be passed through the key-shaped holes 20 whereby the necks of the L-shaped ends 21 are rotatably mounted in the holes, but are prevented from accidentally disengaging therefrom. The clamps are fixed on the tyres, and the ends 21 of the feeler fingers are engaged in the selected holes 20 at the centre of the depth of the tyre. The arms 2 and 2a are adjusted on the rod 1, so that the spring-pressed feeler finger 5 is in a middle position, whereby it can be moved inwardly or outwardly in the slide bracket 4. The pointer arm 7 then lies over the scale on the dial plate 6, and the dial plate 6 is adjusted so that the pointer arm 7 is at zero on the scale. In this position the clamps 14 are at the rear of the wheels at axle height and the spring pressure on the feeler finger 5 sets the ends of the L-shaped pivots against stops formed by the faces of the limbs 15 of the clamps. The vehicle is now moved forwardly so that the wheels are turned 180°. The bar 1 lies in front of the wheels and during the forward moving of the vehicle it travels forwardly on the ground and conveniently a wheel 22 is mounted on each end of the bar 1. The movement of the pointer arm 7 from the zero position indicates the amount of "toe-in" or "toe-out." Any adjustments for tracking the wheels which may be necessary can be effected without detaching the gauge. As the mounting of the gauge is not disturbed, accurate measurements are obtained, and as the vehicle travels forwardly from one position of measurement to the other, the measurements will be taken with the wheels in the position they would naturally assume, whilst the vehicle is travelling.

Having thus described the invention, what is claimed as new and desired to be secured by Letters Patent, is:

1. A gauge for testing the track of the front wheels of a motor vehicle, comprising a U-shaped frame, a feeler finger carried by one side arm of said frame, a second feeler finger slidably mounted on the other side arm of the frame in axial alignment with the first-mentioned feeler finger, a clamp mounted on each tyre of the front wheels and pivotally supporting the feeler fingers in axial alignment, each of said clamps being U-shaped to form two legs gripping each side of a tyre and formed of two L-shaped parts adjustably connected together, a member spaced from and mounted on one said leg of the clamp and having a series of perforations any selected one of which receives the ends of said finger feelers.

2. A gauge for testing the track of the front wheels of a motor vehicle, comprising a U-shaped frame formed of a transverse bar having a radial fin and two side arms having openings therethrough of the cross-sectional shape of said transverse bar to slidably mount such arms thereon, means being provided to lock the arms in the adjusted position comprising two bowed springs mounted on said side arms and means to flatten the springs to bind on said transverse bar on each side of the base of the said fin, axially aligned feeler fingers carried by said side arms, and means for pivotally mounting the gauge on the said front wheels to pivot about the feeler fingers.

3. A gauge for testing the track of the front wheels of a motor vehicle, comprising a U-shaped frame, a feeler finger carried by one side arm of said frame, a second feeler finger slidably mounted on the other side arm of the frame in axial alignment with the first-mentioned feeler finger, a clamp mounted on the tyre of each front wheel and forming pivotal supports for the feeler fingers, each of said clamps being U-shaped to form two adjustable legs for gripping each side of a tyre, a member spaced outwardly from the gripping surface of a leg of each clamp and having a perforation therein in which a feeler finger is rotatably mounted, a head on the feeler finger adapted to lie on the inner side of said member, the said perforation and head being so shaped that the head cannot be withdrawn through said perforation except in a predetermined angular position.

EVAN MEIRION ARTHUR.

REFERENCES CITED

The following references are of record in the file of this patent:

UNITED STATES PATENTS

| Number | Name | Date |
| --- | --- | --- |
| 1,265,599 | Bowden | May 7, 1918 |
| 1,449,289 | King | Mar. 20, 1923 |
| 1,516,909 | Bath | Nov. 25, 1924 |
| 2,036,895 | Tharp | Apr. 7, 1936 |
| 2,159,084 | Harrison | May 23, 1939 |
| 2,401,715 | Wilkerson | June 4, 1946 |

FOREIGN PATENTS

| Number | Country | Date |
| --- | --- | --- |
| 738,404 | France | Oct. 17, 1932 |